May 26, 1953  F. STOSSEL  2,639,534
DECOY
Filed May 10, 1948  2 Sheets-Sheet 1
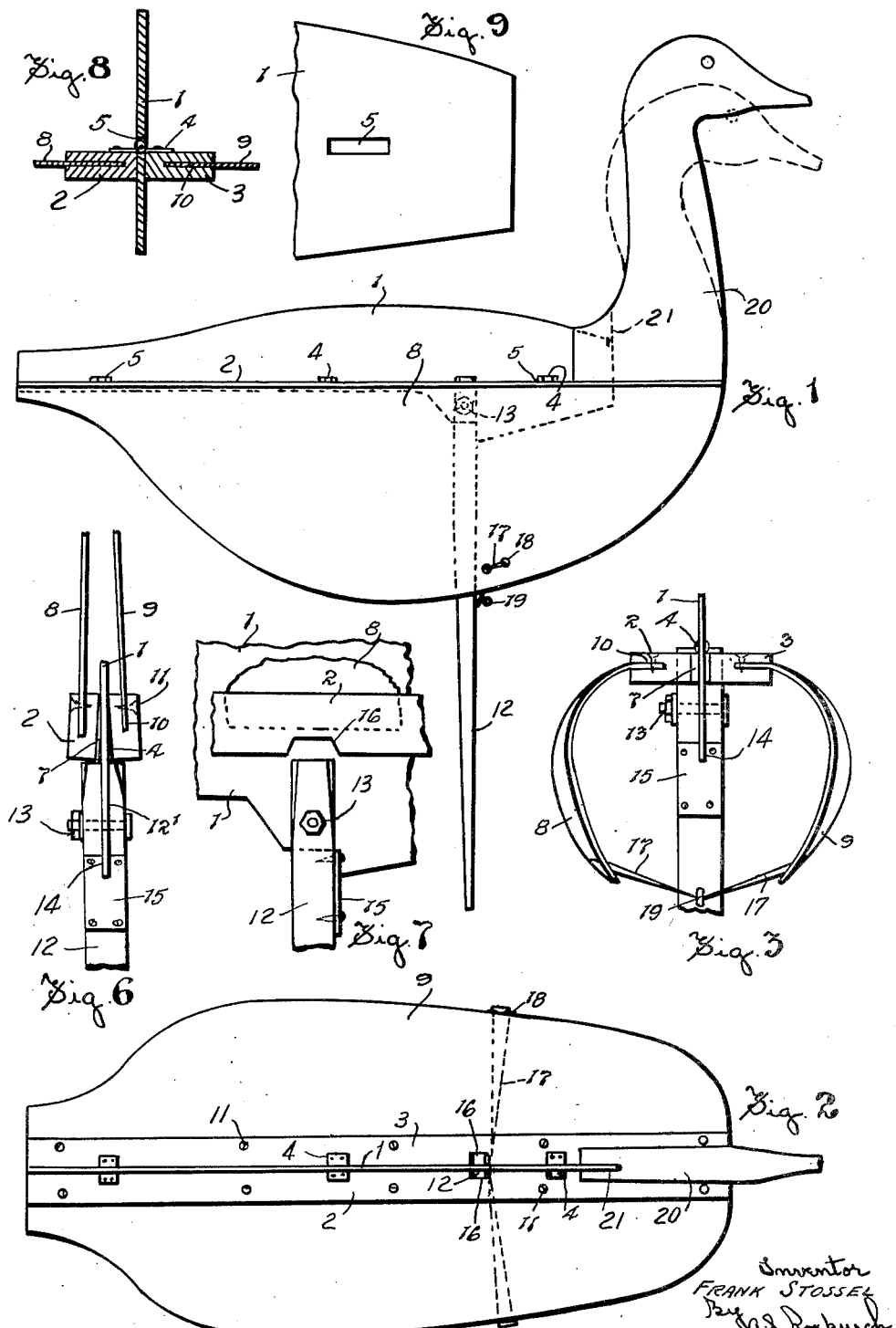

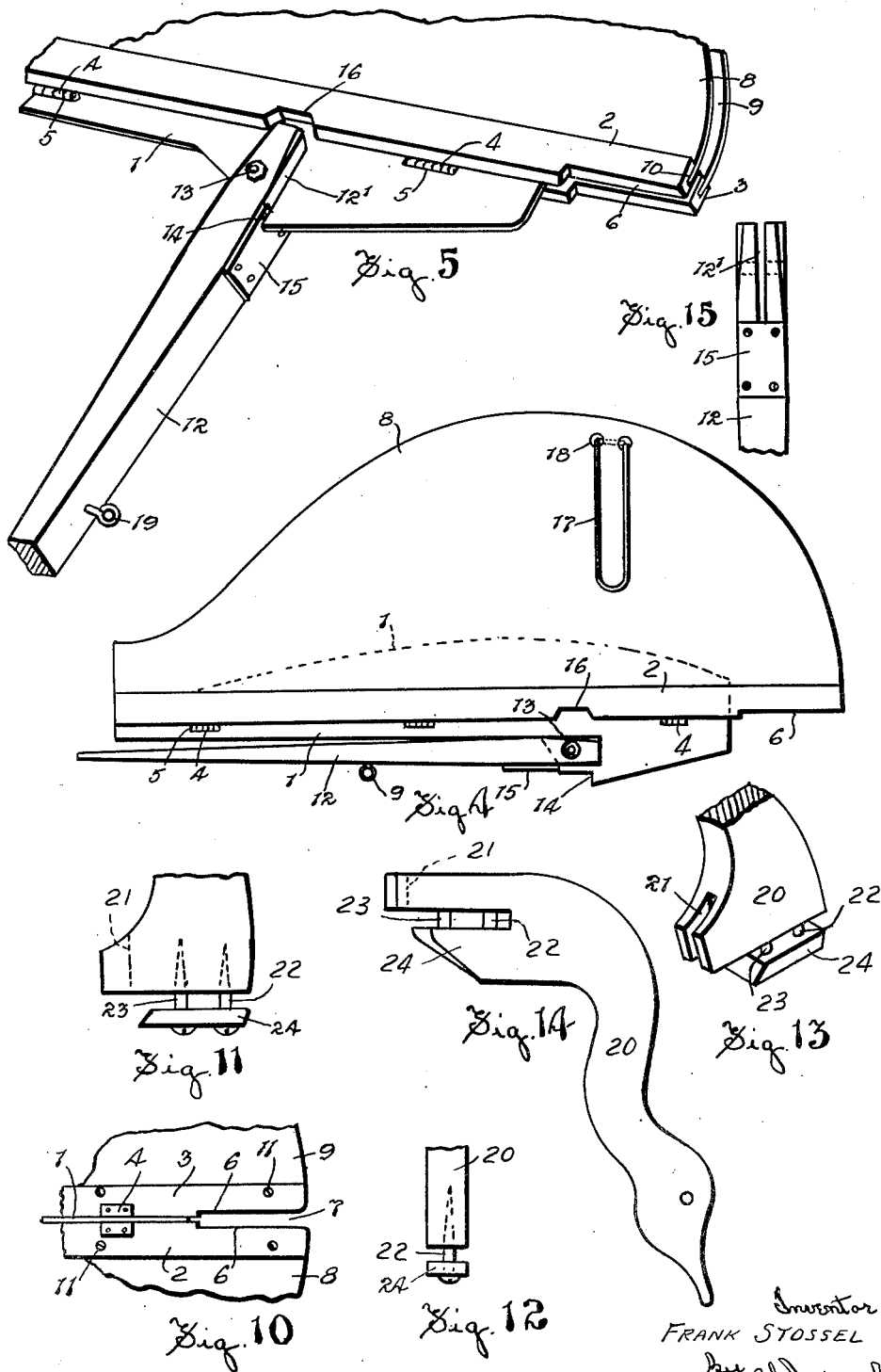

Patented May 26, 1953

2,639,534

UNITED STATES PATENT OFFICE 2,639,534

DECOY

Frank Stossel, Winnipeg, Manitoba, Canada

Application May 10, 1948, Serial No. 26,219

3 Claims. (Cl. 43—3)

The invention relates to improvements in decoys particularly adapted for luring geese or ducks to alight on the field where such decoys are placed, and an object of the invention is to provide a decoy which so closely resembles the wild bird in shape and marking that a flying goose or duck when approaching from any angle will be deceived, and enticed to land near the decoy.

A further object is to provide a decoy having removable and interchangeable head and neck units, so that a group of decoys having head and neck units in various positions, can be placed on the field to better lure and entice the wild birds as they approach.

A further object is to provide a decoy having a head and neck unit removable from the body unit, and the body unit readily foldable into a compact space for transportation or storage purposes.

A further object is to provide a body unit which when in use will present a body closely resembling a live bird in size, shape and markings, irrespective of the angle at which it is viewed.

A further and more detailed object is to provide a body unit comprising a central vertical plate and flexible wings carried by the body plate, so shaped and marked, that when flexed and held in flexed position they closely simulate the body of the live bird which the decoy is used to attract or lure.

A further object is to provide the body unit with a foldable leg or stake and to so arrange the parts that the stake becomes anchored or locked in a fixed standing position when the folded wings are brought down to flexed position.

A further object is to provide a simple, cheap, durable, and effective means for attaching the wings to the central plate, and while allowing for the up folding of the wings, and of the stopping of the wings in an outstanding, prior to flexing, position.

A further object is to provide a simple cheap and effective means for releasably holding the wings in a flexed position.

A further object is to so shape and position the upper edges of the central plate, that when angularly viewed from above it simulates in outline the contour of the back of a goose or duck.

A further object is to so design the various parts that when the decoy is set up in the field and without the employment of tools it provides a structure sufficiently rigid to withstand wind or rain, and which when not required for use can be easily and quickly disjointed where necessary and folded for transportation or storage purposes.

With the above more important and other minor objects in view, which will become more apparent as the description proceeds, the invention consists essentially in the arrangement and construction of parts hereinafter described, reference being had to the accompanying drawings in which—

Fig. 1 is a side view of the decoy in operating position.

Fig. 2 is a plan view of the decoy as appearing in Fig. 1.

Fig. 3 is a front end view of the decoy with the head and neck unit removed.

Fig. 4 is a side view of the decoy in folded position.

Fig. 5 is an enlarged perspective view showing the stake or supporting leg and other associated parts.

Fig. 6 is a front end view of part of the decoy showing the upper portion of the leg and the associated folded wing portions.

Fig. 7 is a side view of the parts appearing in Fig. 6, with portions thereof broken away.

Fig. 8 is a vertical cross sectional view, the section passing centrally through one of the hinges.

Fig. 9 is a side view of a portion of the central plate and showing one of the hinge receiving slots.

Fig. 10 is a plan view of the front end of the decoy with the head and neck portion or unit removed.

Fig. 11 is a side view of the lower end of the head and neck portion.

Fig. 12 is a front view of the portion shown in Fig. 11.

Fig. 13 is a perspective view of the lower end of the head and neck portion.

Fig. 14 is a side view of a modified head and neck portion.

Fig. 15 is a front view of the upper end of the leg or stake.

In the drawings, like characters of reference indicate corresponding parts in the several figures.

The decoy comprises two main units, a foldable body forming unit with supporting stake or leg and a detachable head and neck unit.

The body unit comprises a number of interconnected parts, designed such that when brought to what might be called an operating position, they simulate the form of a life sized duck or goose; and arranged such that when not in use they can be easily and quickly folded for storage or transportation purposes.

A main, vertical, central plate 1 is provided and to such plate all parts of the body unit are attached. The plate can be formed from sheet metal, or any other desirable material. At opposite sides of the plate, I locate a pair of similar horizontal bars 2 and 3 which have their rear ends terminating at the rear end of the plate and their front ends extending beyond the front end of the plate. (See Fig. 10.) These bars are connected together by similar hinges 4, spaced at intervals and passing through receiving slots 5 cut in the plate, and the arrangement is such that lateral or endwise shift of the bars is prevented but they are free to swing upwardly to take a folded position against the sides of the plate as best shown in Figs. 4 and 5. The bars have their forward ends notched away at their lower inner sides as indicated at 6 and such notching provides an entrance slot 7 (see Fig. 10) between the bars when they are in nonfolded position, the purpose of which will be later apparent.

To the bars I have permanently secured similar left and right, side wings 8 and 9 such being accomplished in the present disclosure, by making a lengthwise extending central saw cut in the outer edge of each bar to provide a channel 10 to receive the inner edge of the wing and fastening the wings in the channels by suitably spaced screws 11.

The wings can be made from cardboard suitably water-proofed or from any other desirable material suitable for the purpose and which will flex for a purpose later disclosed.

To the plate 1, somewhat back from the front end thereof, I attach a foldable leg or stake 12 which has its upper end centrally and vertically slotted as indicated at 12', (see Fig. 15) to receive the under edge of the plate, and which is pivotally attached to the plate by a cross bolt 13. The leg folds rearwardly (see Fig. 4) and in order to stop it in a vertical position when swung down, I have provided the plate with a stop shoulder 14 to engage and stop the leg in the vertical position. The leg is provided with a wear plate 15 engageable with the shoulder. In order to maintain the leg in a fixed vertical position when the decoy is in use, I have adopted the simple expediency of notching each side bar, as indicated at 16, to receive the upper end of the leg when the side bars are swung down from folded position and such arrangement is best shown in Fig. 5 where it will be seen that when the bars are swung down the notch will receive the adjacent split end of the leg and lock it against turning on the pivot bolt. In this connection it is to be noted that the stop shoulder 14, stops the leg positively in the position where the notches will receive and lock the upper end of the leg upon the said bars being swung downwardly.

I have hereinbefore mentioned that the wings are flexible, and in practice they are both flexed downwardly and held in flexed position by similar continuous tie strings 17 passed through suitable pairs of eyes 18 provided in the wings and releasably caught behind the eye or head of a screw 19 or the like carried by the leg.

The head and neck unit 20 is detachably connected to the body unit, and is formed from water proofed wood or other suitable material formed to simulate the head and neck of a duck or goose. According to the present disclosure the lower end of the neck portion is provided with a vertical rear slot 21 (see Fig. 13) which is adapted to frictionally receive the forward end of the plate 1 and two spaced screws 22 and 23 extend downwardly from the underside of said neck portion and carry a block or jaw 24 which is spaced from the neck a distance approximately equal to the thickness of the side bars, 2 and 3. In practice the neck and head unit is frictionally attached to the front end of the body unit, by sliding it rearwardly with the slot 7 receiving the screws, the slot 21 receiving the front end of the plate 1, and the front end of the horizontally disposed bars 2 and 3 received within the space reserved between the block and the lower end of the neck. Obviously the said latter unit can be readily dismounted by pulling it ahead to clear the body unit.

I might here point out that the head and body unit can be modelled in different forms to simulate various goose or duck head poises. In Fig. 1 I have shown in full outline what might be called a "watcher" poised head, and in dotted outline a "natural" or "at ease" poised head, and in Fig. 3, I have shown what might be termed a "feeding" head. In practice it is desirable to use a number of decoys on the field and variously poised and feeding heads would be employed in a group to give the group a most natural appearance with the intent of more effectively enticing geese or ducks flying overhead to land amongst the decoys.

Reverting now to the body unit, I want it to be distinctly understood that the various parts comprising it, when in used position are shaped and formed to simulate as closely as possible the body of a goose or duck, and while I have designated the parts 8 and 9, as wings the term wing is only used to identify such parts for the purpose of description. Actually the wings are shaped as shown in the drawings so that when they are flexed downwardly and held by the tie strings, they very closely simulate the form or shape of the body of a goose or duck with wings folded and here it will also be noticed that the plate extends above the side bars and has its upper edges shaped to simulate the contour of the back of a goose or duck.

In practice the body unit and the head and the neck unit will be painted to give the natural colors and markings of a goose or duck as the case may be, the whole arrangement being such that when the decoy is placed in the field, held in an upright position by the stake, flying geese or duck approaching the decoy or a group of decoys from any direction will see in perspective a ground figure or group of figures so nearly resembling the natural live birds that they will be enticed to land amongst the decoys.

If the wings 8 and 9 be made from cardboard they should be suitably water-proofed after painting such as by waxing.

From the above description it will be seen that after the head and neck unit have been removed the body unit can be readily folded for storing or transportation purposes, by first releasing the tie strings, then folding the wings 2 and 3 upwardly and finally swinging the leg or stake rearwardly and that the folded decoy can be easily and quickly made ready for instant use by reversing the above operation and attaching the head, after the tie strings are caught on the screw 19, and here it will be noticed also that as the hinges are placed at the upper sides of the nonfolded bars 2 and 3, the inner edges of the bars, in nonfolded position, engage the opposite faces of the plate 1 and prevent downswing of the bars under the tension of the tie strings.

The decoy shown in the drawings is one shaped to simulate a goose. A decoy for a duck would be constructed in the same manner, although the several parts would be made somewhat smaller as a duck is a smaller bird than a goose and the markings put thereon would be those simulating the markings of a duck.

What I claim as invention is:

1. In a decoy for birds, a central vertical rigid plate, longitudinally extending side bars engaging the sides of the plate, hinges extending through slots provided in the plate and interconnecting the side bars, said hinges being positioned to permit of upswing of the bars, similar flexible side wings permanently secured to and extending outwardly from the bars and a supporting stake having its upper end split to span the under side of the plate and pivoted thereto to fold rearwardly, said bars being notched to receive and lock the upper end of the downwardly extending stake against movement, upon the said bars being down swung from their up positions.

2. In a decoy for birds, a central vertical rigid plate, horizontally disposed wing carrying side bars hingedly attached to the plate to swing upwardly and having their forward ends extending beyond the front end of the plate and notched away to provide an intervening entrance slot and a head and neck unit having the lower part thereof formed to frictionally enter the slot and provided rearwardly with a vertical slot to frictionally receive the forward end of the plate.

3. In a decoy, a narrow central, vertical, rigid plate, longitudinally extending pivoted bars at the sides of the lower part of the plate and arrested by the plate against down swing but free to turn upwardly, normally outstanding, similar, flexible side wings having their inner edges permanently secured to the side bars and their outer edges shaped to simulate a bird's body upon said wings being flexed downwardly, a supporting stake secured to the underside of the plate and tie strings for securing the wings in a down flexed position, said strings extending between the outer edges of the wings and the stake in their tied positions.

FRANK STOSSEL.

References Cited in the file of this patent

UNITED STATES PATENTS

| Number | Name | Date |
| --- | --- | --- |
| 274,124 | Keller | Mar. 20, 1883 |
| 311,877 | Danz, Jr. | Feb. 10, 1885 |
| 529,463 | Roberts | Nov. 20, 1894 |
| 554,368 | Kunselman | Feb. 11, 1896 |
| 1,316,566 | Fauble | Sept. 23, 1919 |
| 1,452,631 | Barker | Apr. 24, 1923 |
| 2,466,626 | Valasek | Apr. 5, 1949 |

FOREIGN PATENTS

| Number | Country | Date |
| --- | --- | --- |
| 389,522 | Great Britain | Mar. 20, 1933 |